United States Patent [19]
Marino et al.

[11] Patent Number: 5,986,825
[45] Date of Patent: Nov. 16, 1999

[54] OPTICAL ACTUATOR WITH TENSIONED SUSPENSION

[75] Inventors: Philip F. Marino, Rochester; Paul D. Heppner, Hilton, both of N.Y.

[73] Assignee: Eastman Kodak Company, Rochester, N.Y.

[21] Appl. No.: 08/974,662

[22] Filed: Nov. 19, 1997

[51] Int. Cl.⁶ .................................................. G02B 7/02
[52] U.S. Cl. ........................ 359/808; 359/813; 359/823
[58] Field of Search .................................. 359/813, 814, 359/823, 824, 808

[56] References Cited

U.S. PATENT DOCUMENTS

| | | | |
|---|---|---|---|
| 5,285,434 | 2/1994 | Kim et al. | 369/44.14 |
| 5,640,280 | 6/1997 | Lee | 359/824 |
| 5,659,433 | 8/1997 | Marino et al. | 359/813 |
| 5,724,197 | 3/1998 | Barnes et al. | 359/824 |
| 5,768,037 | 6/1998 | Marino et al. | 359/824 |

*Primary Examiner*—Scott J. Sugarman
*Assistant Examiner*—Susanne Letendre
*Attorney, Agent, or Firm*—Pamela R. Crocker

[57] ABSTRACT

An optical recording actuator includes: a base and a lens holder having a lens. A pair of spaced-apart flexible, inextensible, coplanar connecting members are connected between the base and the lens holder. A force is applied to the lens holder in the plane of the connecting members to generate tension in the connecting members. A motor applies forces and moments to the lens holder so that the lens holder can move the lens in a desired manner. The resulting actuator has four controllable degrees of freedom of motion relative to the base: focus, tracking, pitch and roll.

23 Claims, 5 Drawing Sheets

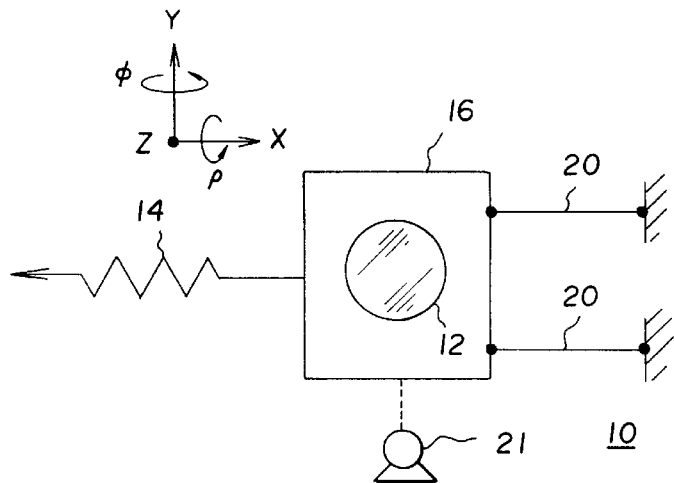
FIG. 2
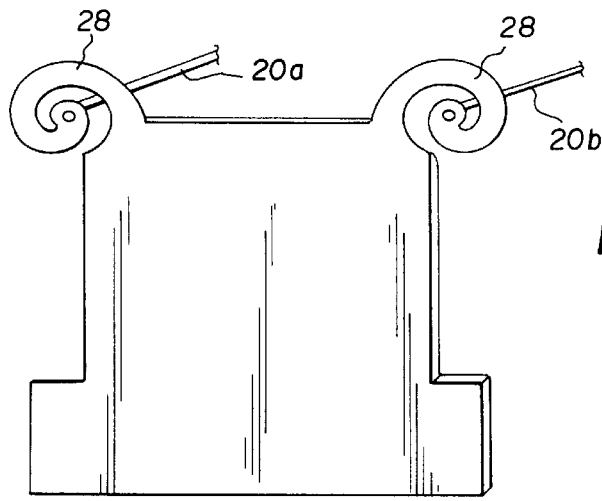
FIG. 4
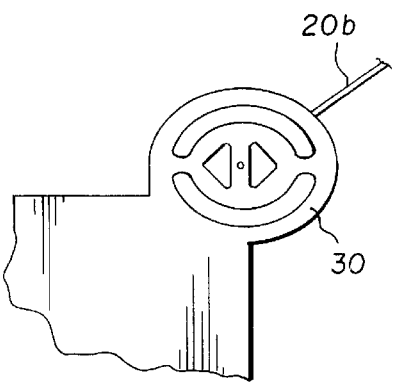
FIG. 5
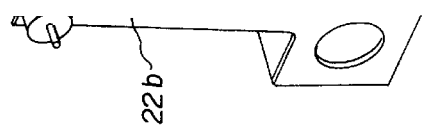

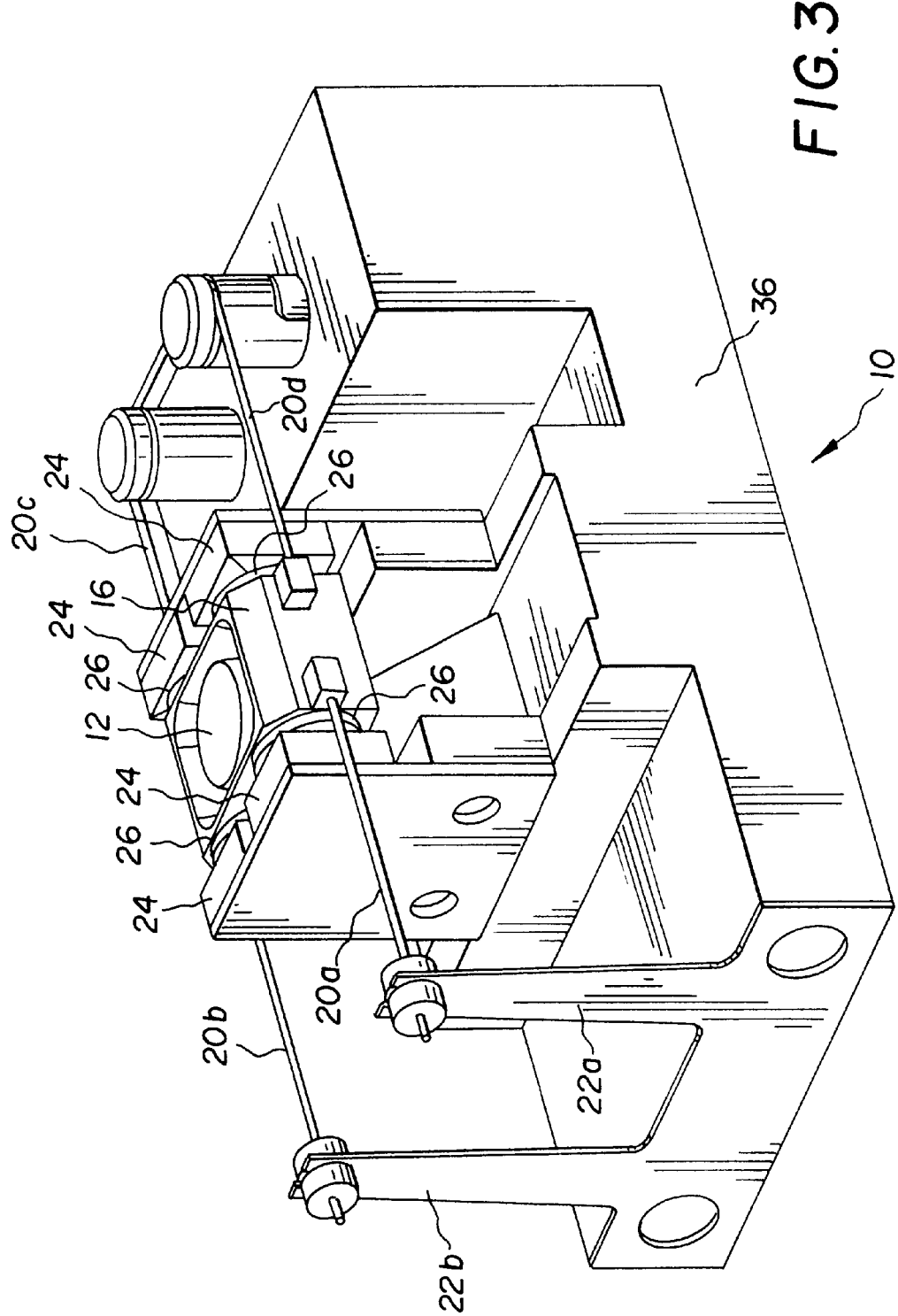

OPTICAL ACTUATOR WITH TENSIONED SUSPENSION

CROSS REFERENCE TO RELATED APPLICATIONS

The present application is related to commonly-assigned U.S. application Ser. No. 08/971,875, filed Nov. 19, 1997, by Simpson et al., entitled "Multiple Degrees of Freedom Actuator for Optical Recording," the disclosure of which is herein incorporated by reference.

FIELD OF THE INVENTION

This invention relates generally to the field of optical actuators for optical storage devices.

BACKGROUND OF THE INVENTION

Optical disk recording and playback devices use Focus/Tracking actuators to control the lens position relative to the rotating disk. This is necessary because of unavoidable warp of the disk, spindle errors, and other mechanical and optical imperfections. Both focus (controlled by the distance between the lens and the disk surface) and tracking (the correct radial position of the lens so as to read or write a single track at a time) must be simultaneously maintained for the reader or recorder to function. The motions of the actuator are controlled by a servo system and the forces which cause these motions are typically generated by one or more electromagnetic motors.

As optical disk recording and reading devices increase in speed (read and write rate), the disk rotational velocity increases. This requires that the Focus/Tracking actuator, which controls the objective lens position so as to maintain proper focus and tracking location of the read/write spot on the disk surface, must respond more quickly and accurately to any disk warping or spindle errors. This in turn requires that any internal actuator resonances be either sufficiently high in frequency, or have sufficient damping so as to allow the required control system performance. Often, the flexures, in flexure-supported actuators, have problematic resonances with low damping, which limit the actuator servo performance.

FIG. 1 shows a conventional optical actuator generally designated 10. The optical actuator 10 includes an objective lens 12 which is well known in the art to focus a laser light beam (not shown) on the surface of an optical disk (not shown). The objective lens 12 is fixed to a lens holder 16 by an adhesive or other fastening structure (not shown). The optical actuator 10 further includes four spaced-apart flexures 18. The flexures 18 are fixed at one end to the lens holder 16 and at their other ends to a base 36. All of the flexure ends are fixed by rigid fixing means; that is, the ends of the flexures are constrained to the base 36 or the lens holder 16 in all six degrees of freedom of motion. An actuator focus coil 38 and tracking coils 40 are bonded to the lens holder 16. These coils are positioned within the magnetic flux generated by magnets 32 and magnetic flux yokes 34. The focus coil 38 and tracking coils 40 provide forces which deform the flexures 18 and move the lens holder 16 and attached objective lens 12 in the Y and Z directions so as to maintain the focus and tracking of the laser beam (not shown) on the optical disk (not shown). Because the flexures 18 are typically manufactured of metal wire, which has very low internal damping, and the end fixing means of the flexures 18 do not add significant damping, the resonances of the wire flexures have very little damping. These resonances are typically in the frequency range of 500 to 10,000 Hz, and cause problems with the stability and performance of the servo used to control the actuator.

Further, as storage capacity is increased, for example in the DVD disk, higher numerical aperture lenses are required for recording and reading data on the disk. Conventional two degrees of freedom actuators (focus and tracking) do not compensate for disk tilt and therefore their performance suffers with use of high numerical aperture lenses. Accordingly, there is a need for an improved four degree of freedom actuator (focus, tracking, pitch and roll) for use with high capacity storage media.

SUMMARY OF THE INVENTION

The present invention is directed to overcoming one or more of the problems set forth above. Briefly summarized, according to one aspect of the present invention, an optical recording actuator includes a base and a lens holder. A pair of flexible, inextensible, coplanar connecting members are connected between the base and the lens holder. A force is applied to the lens holder in the plane of the connecting members for generating tension in the connecting members. The resulting actuator has four controllable degrees of freedom of motion relative to the base (focus, tracking, pitch and roll). In one embodiment, the connecting members are multistrand cables. The invention substitutes the means for applying tension on the lens holder for mass in the connecting members (formerly flexures in the prior art), thereby improving the dynamic performance of the actuator.

ADVANTAGES OF THIS INVENTION

Compared to a conventional actuator suspension, where the flexures have significant bending stiffness, the advantages of the present invention are:

1. Long term positional stability of the actuator with respect to the base. Instability due to creep or warping of the flexures in a conventional suspension are eliminated.
2. Design flexibility in controlling the relative stiffness of the motion of the actuator in all degrees of freedom. For example, geometry changes in the suspension can independently change the pitch mode frequency without changing the frequencies of any of the other rigid body modes.
3. Lower stress in the flexible connecting members results in high fatigue life.
4. Higher dynamic damping of the actuator due to the internal friction of the multistrand connecting elements.
5. Lower connecting element mass resulting in reduced effects of flexure resonances.
6. Improved straight line motion of the actuator.

BRIEF DESCRIPTION OF THE DRAWINGS

FIG. 2 is a schematic diagram illustrating a first embodiment of an optical actuator having tensioned suspension according to the present invention;

FIG. 3 is a perspective view of a second embodiment of an actuator having tensioned suspension according to the present invention;

FIGS. 4 and 5 are partial perspective views of alternative flat tensioning springs;

To facilitate understanding, identical reference numerals have been used, where possible, to designate identical elements that are common to the Figures.

DETAILED DESCRIPTION OF THE INVENTION

Figure 1:
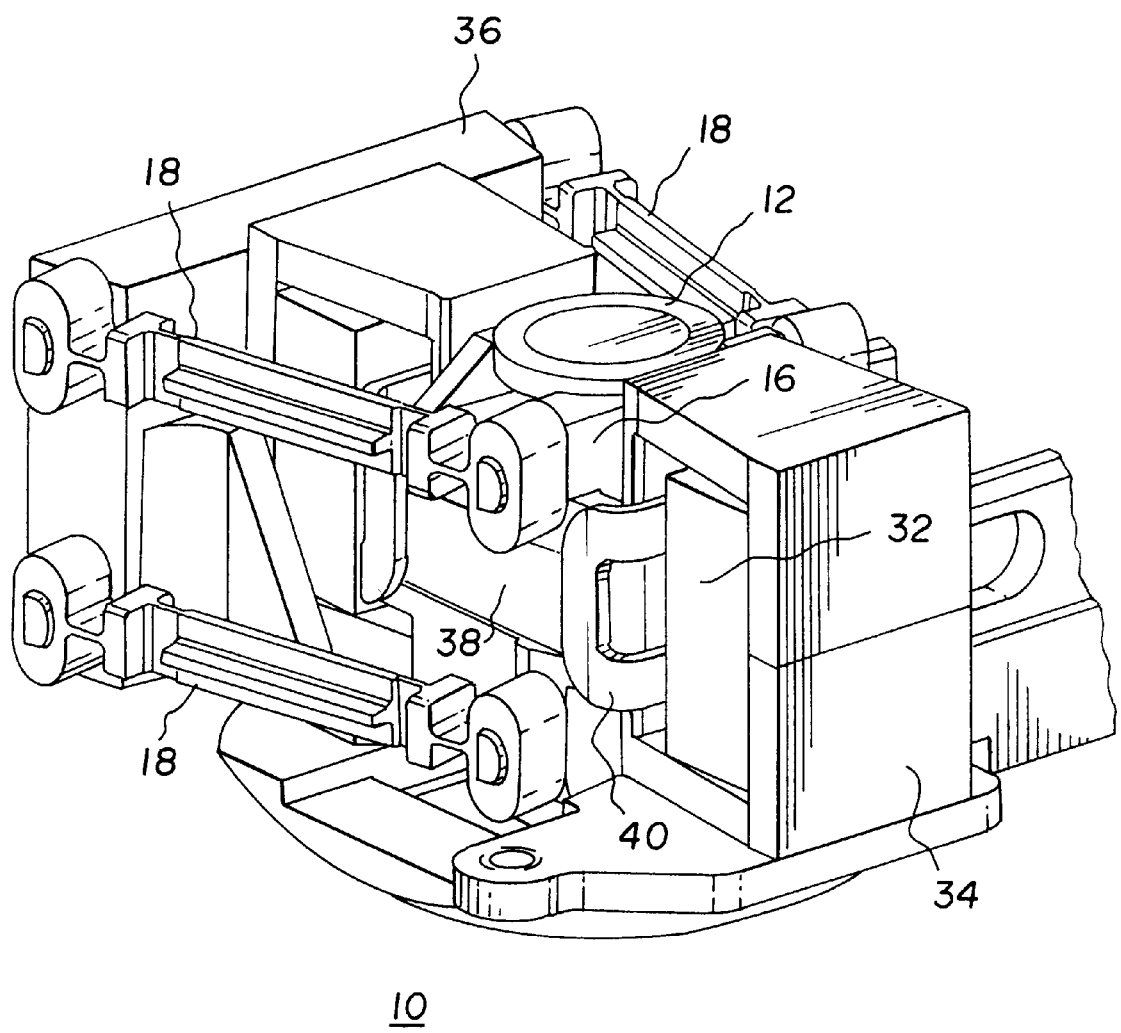
FIG. 1 is a perspective view of a prior art four flexure actuator which provides focus and tracking control.

Referring to FIG. 2, a schematic diagram illustrating a first embodiment of an optical actuator having tensioned suspension according to the present invention is shown. The actuator 10 includes a lens holder 16 for holding an objective lens 12 as is known in the prior art. The lens holder 16 is mounted to a pair of spaced-apart flexible, inextensible, coplanar connecting members 20 to allow movement in four degrees of freedom of motion relative to a base (not shown). The four degrees of freedom of motion are focus (displacement in the Z direction), tracking (displacement in the Y direction), roll (rotation ρ about the X axis) and pitch (rotation φ about the Y axis). The actuator constrains the motion of the lens holder 16 in the X direction and from rotation around the Z axis. Tensioning means, such as a spring 14, is connected to the lens holder 16 to apply force to the lens holder 16 in the plane of the connecting members 20 for generating tension in the connecting members 20. A motor mechanism 21 is connected to the lens holder 16 to apply forces to the lens holder so that the lens holder can move the lens in a desired manner.

As pointed out above, the connecting members 20 are flexible and inextensible. Such members can be provided, for example, by multistrand wire cables, polymer chords, monofilament strings, or chains. The tensioning means for applying force on the lens holder 16 to generate tension in the connecting members 20 can be provided, for example, by springs (helical wire, leaf, or flat spiral); or by magnets.

Referring to FIG. 3, a perspective view of a second embodiment of an optical actuator with tensioned suspension according to the present invention is shown. The optical actuator 10 includes the objective lens 12, which is well known in the art, to focus a laser light beam (not shown) on the surface of an optical disk (not shown). The objective lens 12 is fixed to the lens holder 16 by an adhesive or other fastening structure (not shown). The optical actuator 10 further includes four spaced-apart flexible, inextensible, coplanar connecting members 20a, 20b, 20c, and 20d, which are substantially parallel. The connecting members 20 are preferably 12 mm lengths of 0.1–0.2 mm diameter multi-strand metal cable, employed to support a 0.25–0.5 g lens holder. Two of the connecting members 20c and 20d are fixed at one end to the base 36 and at the other end to the lens holder 16. The other two connecting members 20a and 20b are fixed at one end to the lens holder 16 and at the other end to a pair of 0.1–0.2 mm thick metal leaf springs 22a and 22b which are attached to the base 36. Alternatively, the leaf springs 22a and 22b can be formed from engineering polymers such as polycarbonate. The leaf springs 22a and 22b apply sufficient tension (for example, 0.05 to 0.5 newtons) to each of the connecting members 20a, 20b, 20c, and 20d to support the lens holder 16 in a gap between four actuator magnetic assemblies 24. Focus (or Z motion), tracking (or Y motion), roll (or rotation about the X axis) and pitch (or rotation about the Y axis) are controlled by the actuator magnetic assemblies 24. The connecting members 20c and 20d provide rigid constraint of the actuator motion in the remaining two degrees of freedom of motion relative to the base 36: X motions, and yaw (rotation about the Z axis).

The actuator 10 includes a motor for applying forces and moments to the lens holder 16 so that the lens holder 16 can move the objective lens 12 in the desired manner. Preferably, the motor comprises the four actuator magnetic assemblies 24 and four actuator coils 26 which are bonded to the lens holder 16. The coils 26 are positioned in the flux fields generated by the actuator magnets 24. When current is applied to the coils 26, forces are generated between the actuator coils 26 and the actuator magnetic assemblies 24 which, in total, control the actuator 10 in the four controllable degrees of freedom of motion. A preferred embodiment of the actuator motor will be described in more detail in connection with FIG. 8. Alternatively, other motors, such as conventional focus/tracking motors shown in FIG. 1 can be used. With the motor shown in FIG. 1, the actuator 10 would be controllable in two degrees of freedom of motion: focus (Z motions) and tracking (Y motion), and the suspension would provide location of the actuator 10 in the remaining four degrees of freedom of motion.

FIGS. 4 and 5 show partial perspective views of some alternative patterns for the flat springs used to apply tension to the connecting members 20 in either the first embodiment (FIG. 2) or the second embodiment (FIG. 3) of the present invention. Other patterns of flat springs may also be used in the present invention. FIG. 4 shows flat spiral springs 28. Portions of the tensioned connecting members 20a and 20b are shown and are fixed by conventional means to the flat spiral springs 28. FIG. 5 shows flat symmetric springs 30. Portions of the tensioned connecting members 20a and 20b are shown and are fixed by conventional means to the flat symmetric springs 30. These flat springs have the advantage of being more compact and more easily manufacturable. In addition, flat springs can be fabricated from a single metal or polymer sheet.

Figure 6:
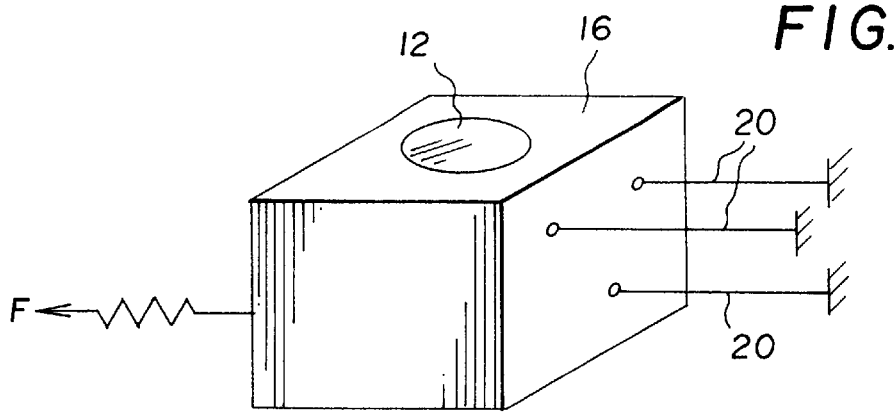
FIGS. 6 and 7 are schematic views of three degrees of freedom actuators according to the present invention.
Figure 7:
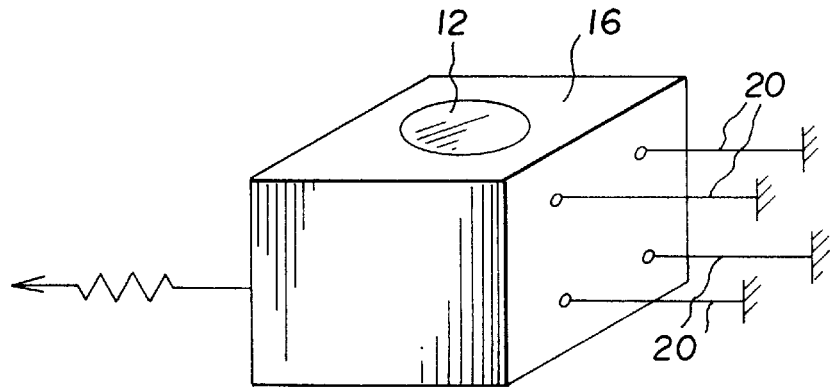

The configurations described above result in an actuator controllable in four degrees of freedom of motion relative to the base. The actuator shown in FIG. 2 uses one pair of spaced-apart flexible, inextensible connecting members, and the actuator shown in FIG. 3 uses two pairs of spaced-apart flexible, inextensible connecting members. Alternatively, as shown in FIG. 6, three sets of parallel spaced-apart flexible, inextensible connecting members 20 arranged to constrain the lens holder 16 in pitch as well as X displacement and yaw could be used according to the present invention. As shown in FIG. 7, four sets of parallel spaced-apart flexible, inextensible connecting members 20 also constrain the lens holder 16 in pitch as well as X displacement and yaw according to the present invention. In either of these cases, mechanical constraint would be provided in three degrees of freedom: Focus, Tracking, and Pitch, and the remaining three degrees of freedom of motion would be controllable by the electromagnetic actuator. In FIGS. 6 and 7, the electromagnetic motors are not shown.

Figure 8:
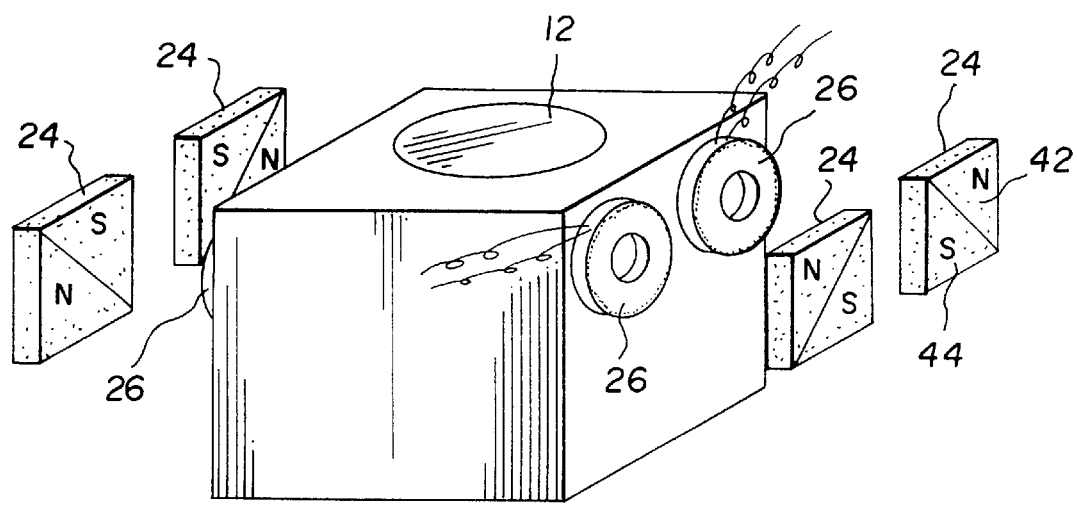
FIG. 8 is a schematic perspective view illustrating one embodiment of a motor employed with an actuator according to the present invention.

Referring to FIG. 8, a preferred embodiment of the actuator motor to be used in accordance with the present invention will be described in more detail. The actuator motor includes four flat circular coils 26 which are bonded to the lens holder 16, and four magnetic assemblies 24 which are fixed to the actuator base 36. Each magnetic assembly 24 consists of two flat triangular magnets 42 and 44, which are each magnetized through the thickness, and oriented with opposite magnetic poles on adjacent faces. Each of the four coils 26 is supplied with electrical current by an amplifier, not shown, to produce force on the lens holder 16. The currents supplied to each of the four coils 26 produce four independent forces which, together, control the position of the lens holder 16 in the four controlled degrees of freedom of motion relative to the actuator base 36. The actuator motor is described in more detail in concurrently-filed, commonly-assigned U.S. application Ser. No. 08/971,875, the disclosure of which is herein incorporated by reference.

Figure 9:
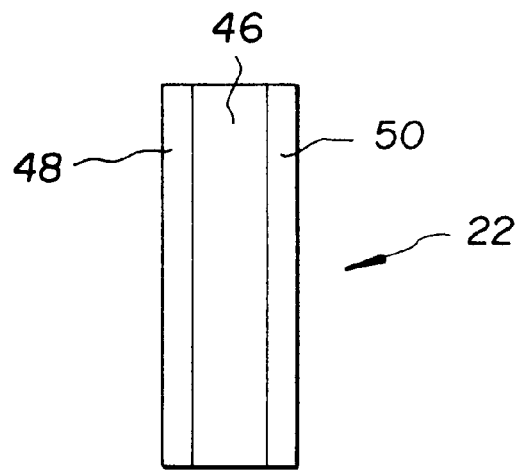
FIG. 9 is a schematic side view illustrating a constrained layer damping leaf spring employed in one embodiment of the present invention.

Referring to FIG. 9, the flat springs 22 may be provided with internal damping characteristics by providing a constrained layer damping structure in the springs. The constrained layer damping structure includes a layer of viscoelastic material 46, such as 3M Scotchdamp®, sandwiched between two layers of metal (or plastic) 48 and 50. The constrained damping structure is tailored to suppress undesirable resonances in the support structure of the present invention, thereby improving high speed actuator performance.

Figure 10:
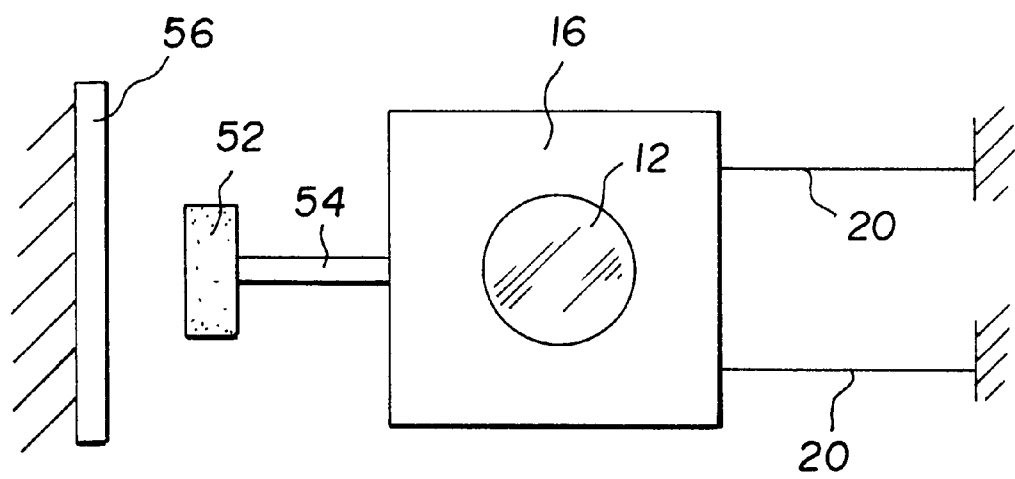
FIG. 10 is a schematic view illustrating an alternative arrangement for applying force to the lens holder according to the present invention.

Referring to FIG. 10, an alternative arrangement using magnets for applying force to the lens holder 16 to create tension in the connecting members 20 is shown. For example, a magnet 52 is attached to the lens holder 16 by a rod 54. The magnet 52 is located near a magnetic plate 56, such as iron, fixed the base of the actuator. The attraction between the magnet 52 and the magnetic plate 56 applies sufficient tension to connecting members 20 to suspend the lens holder 16.

The invention has been described in detail with particular reference to certain preferred embodiments thereof, but it will be understood that variations and modifications can be effected within the spirit and scope of the invention.

What is claimed is:

1. An optical recording actuator, comprising:
    (a) a base;
    (b) a lens holder having a lens;
    (c) a pair of spaced-apart flexible, inextensible, coplanar connecting members, each connecting member of the pair being connected between the base and the lens holder;
    (d) tensioning means connected to the lens holder for applying a force to the lens holder in the plane of the connecting members to generate tension in the connecting members; and
    (e) motor means for applying forces to the lens holder so that the lens holder can move the lens.

2. The optical recording actuator claimed in claim 1, wherein the connecting members are wire cables.

3. The optical recording actuator claimed in claim 1, wherein the connecting members are polymer cords.

4. The optical recording actuator claimed in claim 1, wherein the connecting members are monofilament strings.

5. The optical recording actuator claimed in claim 1, wherein the connecting members are chains.

6. The optical recording actuator claimed in claim 1, wherein the tensioning means for applying the force to the lens holder is a spring.

7. The optical recording actuator claimed in claim 1, wherein the tensioning means for applying the force to the lens holder is a magnet.

8. The optical recording actuator claimed in claim 1, wherein the tensioning means for applying the force to the lens holder is a pair of springs connected to the lens holder to apply tensions along the axes of the respective connecting members.

9. The optical recording actuator claimed in claim 8, wherein the springs are leaf springs connected to the lens holder by a second pair of spaced-apart flexible, inextensible connecting members.

10. The optical recording actuator claimed in claim 8, wherein the springs are flat spiral springs connected to the lens holder by a second pair of spaced-apart flexible, inextensible connecting members.

11. The optical recording actuator claimed in claim 8, wherein the springs are helical springs connected to the lens holder by a second pair of spaced-apart flexible, inextensible connecting members.

12. The optical recording actuator claimed in claim 1, further comprising motion damping means connected to the lens holder.

13. The optical recording actuator claimed in claim 12, wherein the motion damping means is a constrained layer damping member.

14. The optical recording actuator claimed in claim 13, wherein the damping member is incorporated in the tensioning means.

15. The optical recording actuator claimed in claim 14, wherein the tensioning means is a flat spring having a layer of damping material attached thereto.

16. An optical recording actuator, comprising:
    (a) a base;
    (b) a lens holder having a lens;
    (c) first and second pairs of spaced-apart flexible, inextensible, coplanar connecting members, each connecting member of the first pair having first and second ends with the first end being fixed to the lens holder and the second end being fixed to the base, and each connecting member of the second pair having first and second ends with the first end being fixed to the lens holder;
    (d) a pair of springs, each spring being fixed to the second end of each connecting member of the second pair of connecting members for applying a force to the lens holder in the plane of the connecting members to generate tension in the connecting members; and
    (e) motor means for applying forces to the lens holder so that the lens holder can move the lens.

17. The optical recording actuator claimed in claim 16, wherein the motor means applies forces and moments to the lens holder so that the lens holder can be controlled in four degrees of motion relative to the base.

18. The optical recording actuator claimed in claim 16, wherein the springs are leaf springs.

19. The optical recording actuator claimed in claim 18 wherein the leaf springs include a layer of damping material attached thereto.

20. The optical recording actuator claimed in claim 16, wherein the springs are flat spiral springs.

21. The optical recording actuator claimed in claim 20, wherein the flat spiral springs include a layer of damping material attached thereto.

22. The optical recording actuator claimed in claim 16, wherein the springs are helical springs.

23. An optical recording actuator, comprising:
    (a) a base;
    (b) a lens holder having a lens;
    (c) first and second pairs of spaced-apart flexible, inextensible, coplanar connecting members, each connecting member of the first pair having first and second ends with the first end being fixed to the lens holder and the second end being fixed to the base, and each connecting member of the second pair having first and second ends with the first end being fixed to the lens holder;

(d) a pair of magnets, each magnet being fixed to the second end of each connecting member of the second pair of connecting members for applying a force to the lens holder in the plane of the connecting members to generate tension in the connecting members; and (e) motor means for applying forces to the lens holder so that the lens holder can move the lens.

* * * * *